United States Patent
Shoshan et al.

(10) Patent No.: US 12,266,098 B2
(45) Date of Patent: Apr. 1, 2025

(54) IMPROVING MODEL PERFORMANCE BY ARTIFICIAL BLENDING OF HEALTHY TISSUE

(71) Applicant: International Business Machines Corporation, Armonk, NY (US)

(72) Inventors: Yoel Shoshan, Haifa (IL); Vadim Ratner, Haifa (IL)

(73) Assignee: International Business Machines Corporation, Armonk, NY (US)

(*) Notice: Subject to any disclaimer, the term of this patent is extended or adjusted under 35 U.S.C. 154(b) by 505 days.

(21) Appl. No.: 17/523,937

(22) Filed: Nov. 11, 2021

(65) Prior Publication Data

US 2023/0145270 A1    May 11, 2023

(51) Int. Cl.
*G06F 18/2431* (2023.01)
*G06N 3/08* (2023.01)
*G06T 7/00* (2017.01)

(52) U.S. Cl.
CPC ........ *G06T 7/0012* (2013.01); *G06F 18/2431* (2023.01); *G06N 3/08* (2013.01); *G06T 2207/20081* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 7,558,618 B1* | 7/2009 | Williams | A61B 5/489 600/407 |
| 10,496,902 B2* | 12/2019 | Inoue | G06N 3/08 |
| 10,629,305 B2* | 4/2020 | Muller | G16H 50/70 |
| 10,991,093 B2* | 4/2021 | Do | G06F 18/214 |
| 2019/0087694 A1* | 3/2019 | Inoue | G06F 18/2155 |
| 2020/0020097 A1* | 1/2020 | Do | G06F 18/2413 |
| 2020/0117991 A1* | 4/2020 | Suzuki | G06N 3/045 |
| 2021/0034921 A1* | 2/2021 | Pinkovich | G06V 10/764 |
| 2021/0045838 A1* | 2/2021 | Bradbury | H04N 23/21 |
| 2021/0196384 A1* | 7/2021 | Shelton, IV | G06T 15/20 |
| 2023/0169666 A1* | 6/2023 | Pati | G06T 7/73 382/132 |

OTHER PUBLICATIONS

CutMix: Regularization Strategy to Train Strong Classifiers with Localizable Features by Sangdoo Yun, Dongyoon Han, Seong Joon Oh, Sanghyuk Chun, Junsuk Choe, Youngjoon Yoo, published at ICCV 2019, arXiv:1905.04899v2.

(Continued)

*Primary Examiner* — Tsung Yin Tsai
(74) *Attorney, Agent, or Firm* — Anthony M. Pallone

(57) ABSTRACT

A method for improving machine learning algorithm performance is described. The method may comprise receiving a first constituent image of human tissue; receiving a second constituent image of human tissue; overlapping a portion of the second constituent image on a portion of the first constituent image to create an augmented image; and training a model using a dataset comprising at least the augmented image.

13 Claims, 7 Drawing Sheets

(56) References Cited

OTHER PUBLICATIONS

Seamless Insertion of Pulmonary Nodules in Chest CT Images by Aria Pezeshk, Berkman Sahiner, Rongping Zeng, Adam Wunderlich, Weijie Chen, and Nicholas Petrick, published in IEEE Transactions of Biomedical Engineering Dec. 2015; 62(12), pp. 2812-2827. doi: 10.1109/TBME.2015.2445054.

Seamless lesion insertion for data augmentation in CAD training by Aria Pezeshk, Nicholas Petrick, Weijie Chen, and Berkman Sahiner, published in IEEE Transactions on Medical Imaging. Apr. 2017; 36(4); pp. 1005-1015, doi: 10.1109/TMI.2016.2640180.

Seamless lesion insertion in digital mammography: methodology and reader study by Aria Pezeshk, Nicholas Petrick, and Berkman Sahiner published in SPIE Proceedings vol. 9785, Medical Imaging 2016: Computer-Aided Diagnosis; 97850J (2016) https://doi.org/10.1117/12.2217056.

Towards the use of computationally inserted lesions for mammographic CAD assessment by Zahra Ghanian, Aria Pezeshk, Nicholas Petrick, and Berkman Sahiner published in SPIE Proceedings vol. 10577, Medical Imaging 2018: Image Perception, Observer Performance, and Technology Assessment; 105770L (2018) https://doi.org/10.1117/12.2293800.

Zhang et al., Mixup: Beyond Empirical Risk Minimization, Retrieved from: https://arxiv.org/abs/1710.09412, Apr. 27, 2018, vol. 1, 13 pages.

\* cited by examiner

IMPROVING MODEL PERFORMANCE BY ARTIFICIAL BLENDING OF HEALTHY TISSUE

BACKGROUND OF THE INVENTION

The present disclosure relates to improvements of machine learning algorithms which help health care workers identify or classify diseased or injured tissue in a human body.

Medical X-rays of human tissue may help identify cancerous tumors, lesions, and other conditions in patients. The process of identifying such conditions based on medical images is slow and requires intensive training of the human radiologist. Machine learning algorithms or models may supplement identification of, for instance, cancerous lesions.

When training machine learning or artificial intelligence (AI) models, over-fitting of models on the training data is a significant problem, which may result in too few correct classifications. When classifying (or generally detecting) medical images as diseased or healthy, an AI model may learn patterns which are overly specific and fail to generalize well. Thus, patients who may have a condition or diseased tissue may not be correctly identified as such (a false negative) or patients who are healthy may incorrectly be identified as having a condition (a false positive).

Accordingly, a need arises for techniques that improve the ability of machine learning models to correctly classify or identify diseased human tissue from medical images.

SUMMARY OF THE INVENTION

The techniques described herein enable improved performance of machine learning models or algorithms for distinguishing between images of healthy and unhealthy tissue.

For example, in an embodiment, an image of unhealthy tissue (e.g. a mammogram with a cancer) may be overlain with an image of healthy tissue to create a hybrid or augmented image. This hybrid or augmented image may comprise a portion of a training data set for a machine learning algorithm or model and may improve the accuracy of the model or algorithm in identifying unhealthy tissue.

A method for improving machine learning algorithm performance is described. The method may comprise receiving a first constituent image of human tissue and a second constituent image of human tissue. The method further may comprise overlapping a portion of the second constituent image on a portion of the first constituent image to create an augmented image. This augmented image may be used as training data for a model. The first constituent image may comprise unhealthy or diseased human tissue or healthy human tissue. The second constituent image may comprise unhealthy or diseased human tissue or healthy human tissue.

The model may classify the augmented image according to the classifiers of the first constituent image and the second constituent image.

A system for improving machine learning algorithm performance is described. The system may comprise a processor, memory accessible by the processor, and computer program instructions stored in the memory and executable by the processor to perform a series of steps. The steps may comprise receiving a first constituent image of human tissue and a second constituent image of human tissue. The system further may comprise overlapping a portion of the second constituent image on a portion of the first constituent image to create an augmented image. This augmented image may be used as training data for a model.

The system may classify the augmented image according to the classifiers of the first constituent image and the second constituent image.

A computer program product for improving machine learning algorithm performance is described. The computer program product may comprise a non-transitory computer readable storage having program instructions embodied therewith, the program instructions executable by a computer, to cause the computer to perform a method. The method may comprise receiving a first constituent image of human tissue and a second constituent image of human tissue. The method further may comprise overlapping a portion of the second constituent image on a portion of the first constituent image to create an augmented image. This augmented image may be used as training data for a model.

The computer program product may classify the augmented image according to the classifiers of the first constituent image and the second constituent image.

In the above, the pixel values of the overlapping portion of the augmented image may be determined by a function which receives as input a first value of a pixel from the first constituent image at the overlapping location. The function may receive as input a second value of a pixel from the second constituent image at the overlapping location. The function may comprise taking the maximum pixel value of any of the constituent images at the overlapping location. The function may comprise a weighted sum of the values of the pixels of the constituent images at the overlapping location. The weights of the weighted sum may be based on a first image classifier, a second image classifier, a position in the first constituent image, or a position in the second constituent image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

In many domains, it is resource intensive to gather an extremely large and diverse set of images (or samples) in order to properly train a machine learning model or other algorithm. Augmentation of images may be an effective method for creating training data for such a model.

In clinical practice, part of the challenge of a radiologist when examining an image, is that a potentially harmful lesion may be "hidden" under healthy tissue, making the lesion hard to detect. Machine learning algorithms may help medical practitioners to identify diseased tissue (e.g. a malignancy), but the superposition of tissues may resemble a malignancy. In addition, information may be lost due to the projection of a real 3D world onto a 2D plane. For example, in mammograms, the resulting 2D image is a result of projection of the real 3D world unto a plane. Since the incident radiation travels through the entire volume of material, the plane projection of the 2D image incorporates absorption information of all the intervening layers of tissue including the problematic region (e.g. a lesion) as well as much healthier tissue. While focusing the X-rays into a single plane of interest helps, it does not completely remove the problem of interpreting the data and classifying the image as diseased or healthy (binary categorization) or classifying the images as having one of multiple categories (e.g. disease 1, disease 2, disease 1 & disease 2, or healthy).

Figure 6:
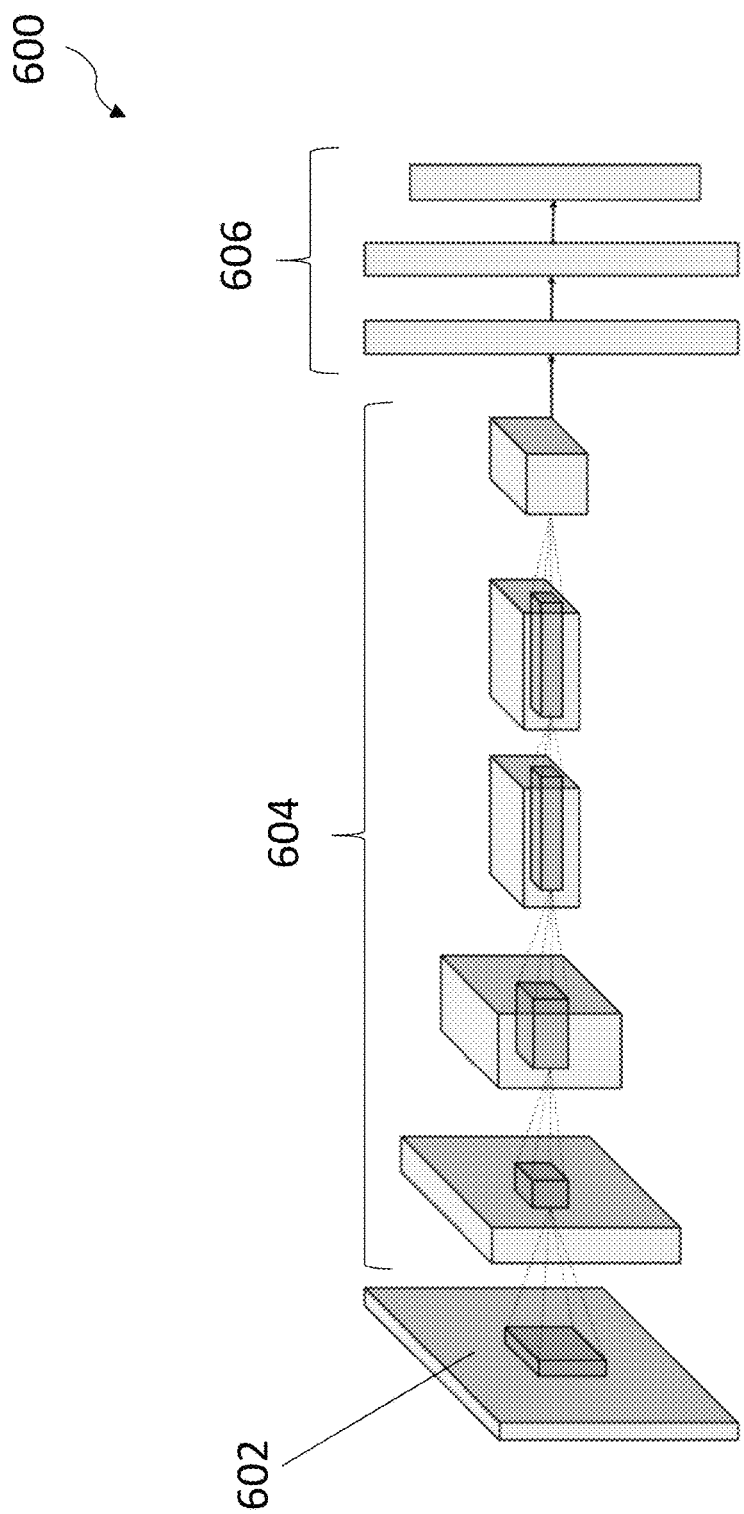
FIG. 6 illustrates an overview of a convolutional neural network (CNN).

FIG. 6 illustrates a schematic of an example machine learning model in the form of a convolutional neural network 600. In one embodiment, the convolutional neural network (CNN) 600 comprises an input image 602, which is input to a first layer. The first layer is connected to the various subsequent layers by a series of operations. These layers may include convolutional layers 604, and in the example depicted here, may comprise five convolutional layers 604 of the network 600. There may also be fully connected layers 606 in the network 600. In the example shown, there are three fully connected layers 606. As is known to those skilled in the art, many different forms of neural networks or other AI models may be employed to classify images. Other layers, including max pool layers, a softmax function, a logistic function, and the like, may also be used. Rectifying linear unit correction layers may also be used in conjuction with various other layers, and the order of these operations and layers may be varied as necessary.

Figure 1:
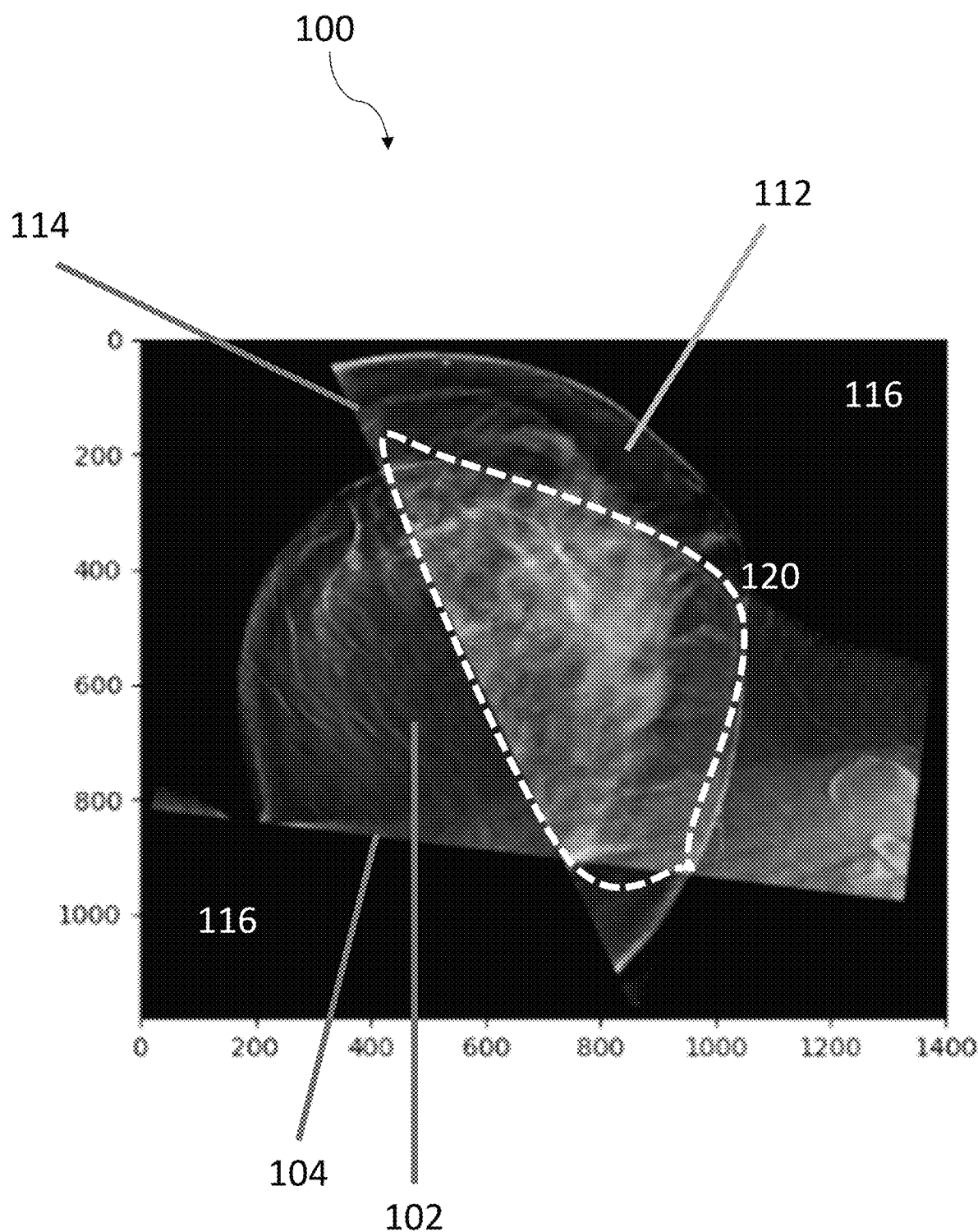
FIG. 1 illustrates an augmented image.

FIG. 1 shows an example of the use of the present invention. An augmented image 100 is shown, which comprises a first image 102 of a mammogram with a known cancerous region (not identified in the image). The first image 102 has a straight line boundary 104 where the image was cropped or the detector's field of view ended. A second image 112 of healthy human tissue is rotated and superimposed or overlain atop the first image 102. This second image 112 also has a straight boundary 114, where the image was cropped or the detector's field of view ended. The completely black regions 116 show no human tissue being imaged. A region where the second image 112 is superimposed upon the first image 102 is shown schematically (but not precisely) by a dashed white line 120. This region is the overlap region of the two images. In regions where both images are dark, the new, augmented image is also dark. In regions where only one of the images is not dark, the augmented image will take the values of the non-dark image. In regions of overlap (e.g. within the boundary 120 in this example), the augmented image will take on values of brightness based upon the values of brightness of each of the overlapping images. More details of this operation are given below.

Figure 2:
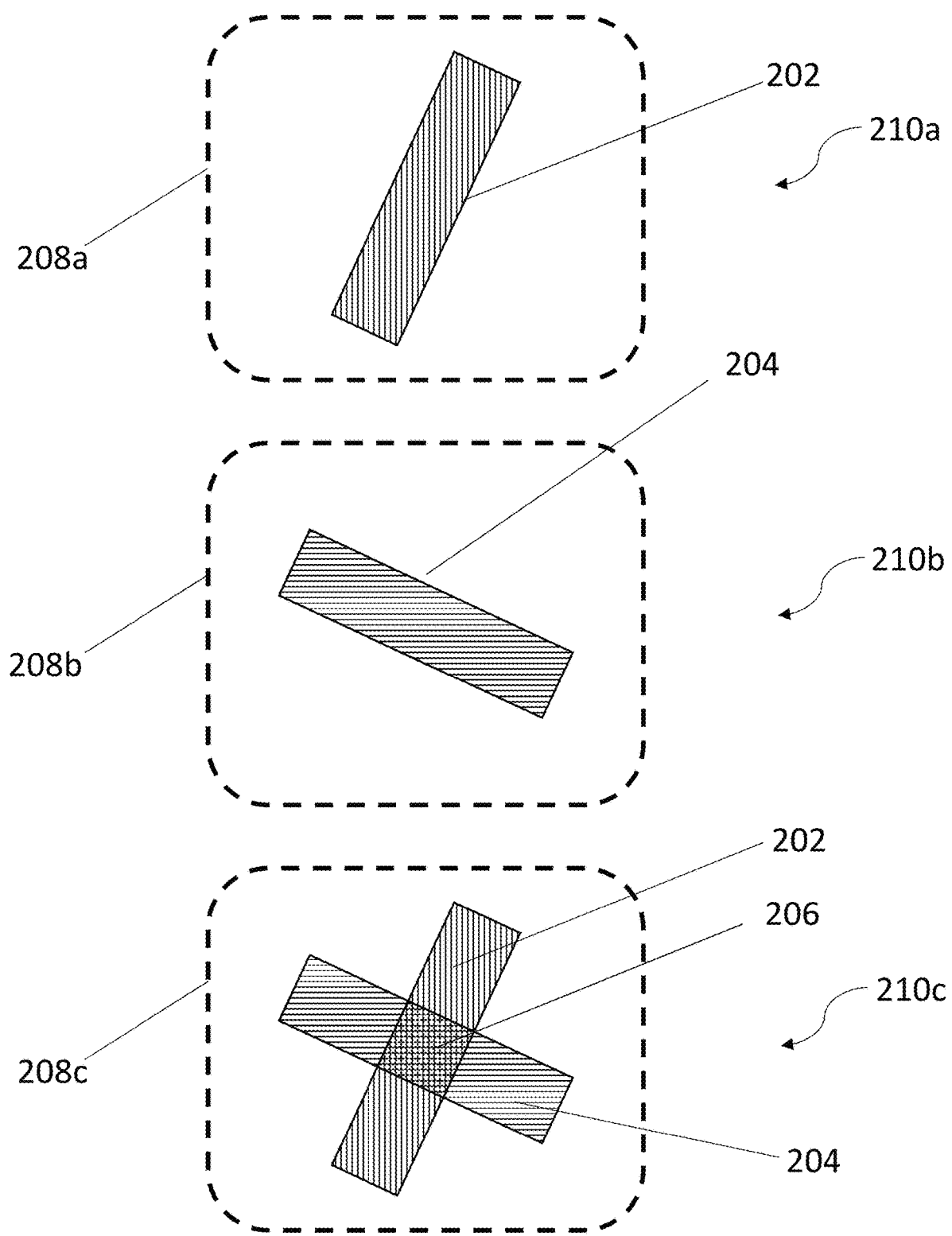
FIG. 2 illustrates a superposition of two images.

FIG. 2 illustrates an image of two overlapping rectangles standing in for human tissue. Three images are depicted. A first image 210a which is delineated by a first frame edge 208a. Inside the image is a rectangle 202, standing in for diseased human tissue. A second image 210b shows another rectangle 204, standing in for healthy human tissue. The second image is delineated by a second frame edge 208b. The parts of the images without the rectangles are blank. The third image 210c is delineated by a third frame edge 208c. The first rectangle 202 has some non-dark pixels denoted by the verticle stripes. The second rectangle 204 likewise has some non-dark pixels denoted by horizontal stripes. When the images are superimposed on each other to form the third image 210c, they form distinct regions in the resulting augmented image 210c, Specifically there is an overlapping region 206 denoted by a grid of overlapping verticle and horizontal stripes. In this overlapping or intersecting region 206, the pixels of the new image may be based on some combination of the values of the pixels in the first rectangle 202 and on the values of the pixels in the second rectangle 204 in the region of overlap 206. In regions where there is no overlap the augmented image 210c takes on the value of whichever image has non-zero pixel values at that location. In the overlapping region 206, the pixel values must be assigned a value. An exemplary method of combining the first image 210a and the second image 210b to form the third image 210c is to add the images for the non-intersecting areas 202, 204. For the overlapping or intersecting region 206, the augmented image may be the sum of both images times a weighting factor according to the following equation:

Augmented image in overlapping region=$\alpha$*layer$_1$+(1−$\alpha$)*layer$_2$.

The parameter $\alpha$ may be a weighting factor for the first image and 1−$\alpha$ may be the weighting factor for the second image. Layer$_1$ and layer$_2$ represent the first image and the second image. In an example, the weighting factor $\alpha$ may be 0.5, so that each of the two layers or two images contributes half the value of its pixels to the overlapping region in the augmented image 210c.

Figure 3:
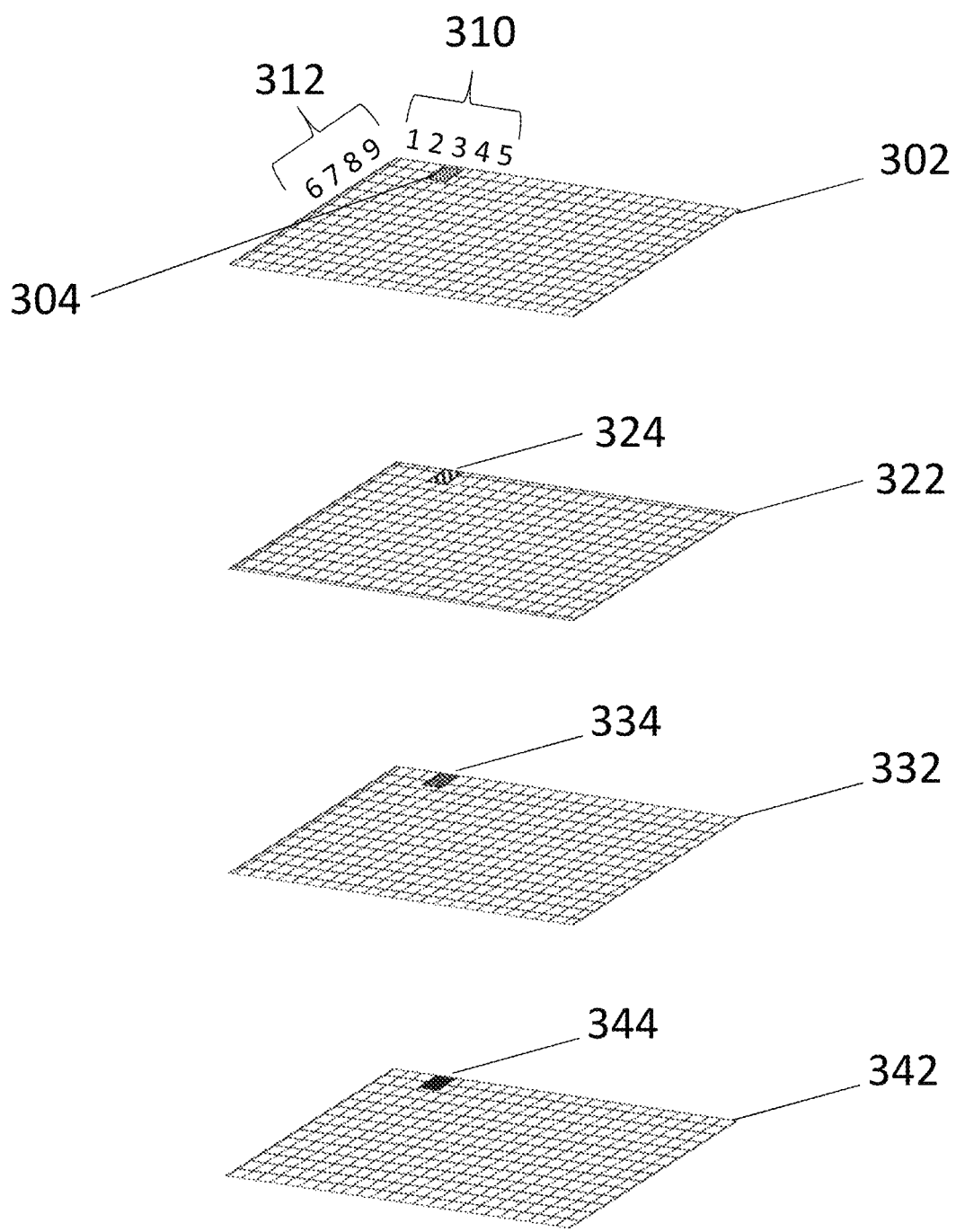
FIG. 3 illustrates combining images.

FIG. 3 shows details of another exemplary method of combining images in an overlapping region, including a first image 302 (also called a first layer 302), a second image 322, a third image 332 and a fourth image 342 which is the augmented image. Portions of the images 302, 322, 332, and 342 are depicted as planes with square pixels for convenience, but other shapes and patterns may also be used (e.g. hexagonal lattice with hexagonal pixels). The pixels are enumerated by a column label 310 and by a row label 312.

To avoid confusion by a plethora of labels, FIG. 3 includes labels only for columns 1 through 5 and for rows 6 through 9. A pixel 304 in column 3, row 9 in the first image 302 is shown shaded to represent some value of the intensity of the signal at that location. Similarly a second pixel 324 at the same location (column 3, row 9) in the second image 322 is shaded, as are the third pixel 334 in the third image 334, and the fourth pixel 344 in the fourth image 342. For this example, three images are combined to form the fourth, augmented image 342. At a minimum, two images may be superposed to form the augmented image 342, but more layers than two may easily be incorporated, as necessary. The fourth pixel 344 of the augmented image 342 is assigned a value representing the intensity of a signal (e.g. brightness). The value of this augmented image pixel 344 is generated by a function which takes into account the value of the pixels at the corresponding location in the constituent images. Thus the value of fourth pixel 344 in this example may depend on the values of the three pixels 304, 324, and 334 of the three constituent images 302, 322, and 332.

One exemplary method for determining the value of the fourth pixel 344 may be to set it equal to the sum of the constituent pixel values (i.e. value of fourth pixel 344 equals the sum of the values of the first pixel 302, the second pixel 322, and the third pixel 334). Another exemplary function may comprise setting the value of the fourth pixel 344 as the maximum value of the values of the first pixel 304, the second pixel 324, and the third pixel 334. Yet another exemplary method for setting the value of a pixel in the augmented image may comprise adding the values of first pixel 304, the second pixel 324, and the third pixel 334, but multiplying each of these pixel values by a different weighting factor for each layer. The combining function may take as input the values of the first pixel 304, the second pixel 324, and the third pixel 334 to calculate the value of the new image pixel 344.

An example of a combining function for the creation the augmented image may be performed by adding the images for non-intersecting areas of the new image. For a region in which the constituent images intersect or overlap, each new (agumented) pixel may be assigned to the value $\alpha \ast pixel_{i1} + (1-\alpha) \ast pixel_{i2}$ where a is a weighting factor (e.g. 0.5) and $pixel_{i1}$ and $pixel_{i2}$ are the values of the i-th pixel in the first image or of the i-th pixel in the second image. One can generalize this by having a special weighting layer $\alpha_j$ for each layer j of all the images. Then each new pixel of the resulting augmented image will be assigned a value based on the sum of the pixel of the overlapping layers times a weight:

$$pixel_{i,augmented} = \Sigma_{j=1}^{N} \alpha_j \times (\text{layer pixel})_{ij}$$

The weights assigned to each layer pixel of the resulting augmented image may be defined by various procedures. For instance, the weights $\alpha_j$ may be normalized so that their sum equals 1. Under some circumstances, each entire image may receive a certain weight or all images may receive equal weights. Under other circumstances, other weighting schemes may be used which may preference certain layers relative to other layers. For instance, the healthy tissue images may receive a larger weighting factor than the diseased tissue images. A position in an image may be known healthy and may receive heavier weights than another position in the image. Another example may assign more weight to certain portions of certain layers (e.g. the region of the tumor itself may be assigned greater weight than other regions) while assigning less weight to other positions in the image, other regions of the image or to other images.

These augmented images may, of course, be further transformed or augmented separately from their superposition, to form patterns which the model may find hard to overfit and which may improve the model sensitivity to diseased tissue, even if the diseased tissue may be at least partially obscured by healthy tissue.

For creating training image datasets, it is standard practice to transform the original images to allow the model to encounter slightly different images for training purposes. Some typical transformations which may be performed comprise affine transformations (e.g. rotation, translation, etc.), color manipulations (gamma, contrast, etc.), as well as cropping portions of the image and applying such transformations or manipulations on the cropped portion only. In general images may be augmented in some manner to increase the number of images used for training a model, and also to increase the robustness of the model to correctly classify or identify an as yet unseen image. Using such augmented training data makes it harder for the model to overfit to a specific and limited set of patterns encountered in the data. In addition, when creating a training data set, it is important to have many samples with each of the end classifiers. Thus, when creating the training and testing data sets, it is also possible to use an original image of healthy tissue and combine it with a superposed image also of healthy tissue. In this instance the resulting classification would be healthy tissue. Including multiple images of healthy tissue superposed on other healthy tissue is an important part of the training and testing data since it avoids the pitfall of having the model (incorrectly) learn that all combinations of images are classified as unhealthy.

Another key parameter is the percentage of overlap between the two or more images on these augmented images. An extra set (k in number) of layers of healthy images may be blended or superposed on top of an original (e.g. diseased) sample. Since the original image has already been classified as diseased, the resulting augmented image may also be classified as diseased without having to re-evaluate. Thus the ground truth label that the loss function is built on is unchanged.

Given a base tissue image (e.g. a mammogram with a cancerous tumor), at least one and up to k layers of tissue may be superposed on top of the original image. The base tissue image may also comprise healthy tissue or unhealthy tissue. Likewise the k layers of superposed images may comprise both healthy and unhealthy tissue. Indeed, the k layers need not be healthy tissue at all, but could be images of other tissue, healthy or with another condition. These tissue images need not come from the same person, but may originate from a different individual. The goal is the creation of a new database of augmented or hybrid images for training a machine learning algorithm for aiding in the diagnosis of certain illnesses, diseases, or conditions.

In another example, an image of unhealthy tissue (e.g. a lesion) may be superposed onto an existing image of healthy tissue. This disclosure teaches the use of any tissue, superposed on another image of tissue to create an augmented image (or hybrid data) for use in training a machine learning algorithm (or other model). Each of the layers or images may also be augmented on its own, independently of the other layers before or after forming a new image.

In those instances for which an image of diseased tissue is the original image, atop which other layers are superposed, the classification of the image is diseased. Thus there is no requirement for separately annotating or classifying the new, augmented image. The classification is already known. Likewise in instances for which the original or base image is of healthy tissue and an image of healthy tissue is superposed on the base image, then the classification taught to the model will also be of healthy tissue.

This method was empirically tested for the case with a base image of diseased tissue with superposed images of healthy tissue. In this empirical testing, the images were already classified as one of two binary outcomes: diseased (e.g. tumor present) or healthy (tumor absent). Under these conditions (binary output of the AI model), this method has consistently improved performance based on the interpretation of an improved receiver operating characteristic (ROC) and an improved area under the curve (AUC) of the ROC. This method of evaluating models is well known for binary classifications.

In an example, the base or first layer determines the malignancy (a.k.a. the ground truth—a true positive for identification of a lesion). Thus a first image (or base layer) may contain a verified malignancy. The other layer or layers may comprise healthy tissue.

In another example, properties of different layers may be aggregated. For example, say a first layer includes a calcification and a second layer contains a tumor. The resulting classification (the ground truth) will be (calcification+tumor) out of the four possibilities (healthy, tumor, calcification, and calcification+tumor).

This method of superposing healthy tissue images onto an image of a known diseased tissue is more general than creating augmented data by placing cropped images of malignancies and embedding them into images of healthy tissue. One may also superpose an image of healthy tissue onto another image of healthy tissue or an image of diseased tissue onto another image of diseased tissue. Embedding images of a malignancy (e.g. cropped from a full mammogram) into an image of healthy tissue is just a special case of this more general method of superposing two or more images of known classification.

When the model is used to propose a diagnosis during actual operation (i.e. during inference), after training has been completed, stand alone images (i.e. those without augmentation) may be used. Thus, in exemplary operation, an original, unaugmented image may be fed into the model. Alternatively, in another example, the original image may also be augmented in multiple ways as described elsewhere in this disclosure, and these images may be included in the test data set to confirm or verify the use of the model (test-time-augmentation).

An advantage of this method is that it can use multiple images, from different people, without loss of impact for the training data set.

For certain image classification models, multiple labels may be used (e.g. half dog half cat), but for medical diagnosis, it may be better to have a single label: tumor or no tumor, even if other conditions are also present.

Figure 4:
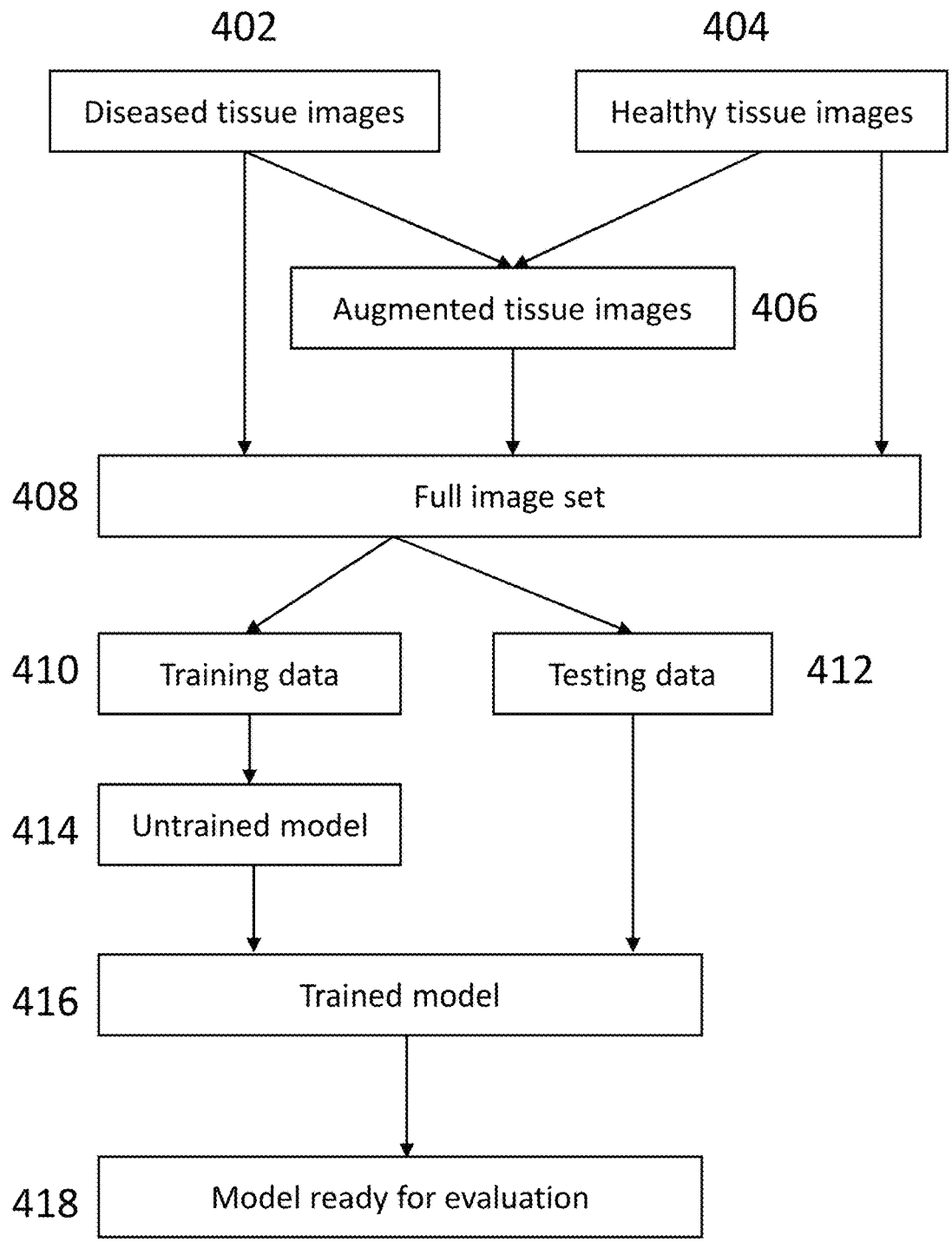
FIG. 4 illustrates a process for training a model.

FIG. 4 illustrates how the augmented images might be included in training data to improve the accuracy of a model. Images of known diseased tissue 402 form part of a database of images. Images of known healthy tissue 404 form another part of a database of images. These images may be of the same patient or of different patients. These images may be combined to form augmented images 406 as noted elsewhere.

The diseased tissue images 402 or the healthy tissue images 404 may be modified as necessary as part of their being combined to form the augmented tissue images 406. An augmented tissue image 406 may comprise superposing a healthy tissue image 404 on a diseased tissue image 402. An augmented tissue image 406 may comprise a superposition of many healthy tissue images 404 on a single diseased tissue image 402. The augmented tissue image 406 may also comprise multiple diseased tissue images 402 or multiple healthy tissue images 404.

The augmented tissue image 406 may comprise applying a transformation to any of the constituent images prior to superposing the images to form the augmented images. An example transformation may be to crop, shift, or rotate the image prior to superposing it. Another example transformation may be to modify a color scheme or to enhance a brightness of a single image or of several images. A full image set 408 comprising diseased tissue images 402, healthy tissue images 404, and augmented tissue images 406 may be assembled.

The full image set 408 may be divided into two data sets: a set of training data 410 and a set of testing data 412. An untrained model 414 (e.g. a CNN, as noted above) may be trained on the training data 410 to produce a trained model 416. An example of a trained model may be a CNN, as noted above, for which the weights of the parameters for calculating the classification have been determined by minimizing a loss function based on the training data. An untrained model 414 may have its weights set at some initial values prior to the use of training data 410.

An example of training may comprise backpropagation using gradient descent to minimize a loss function. Once a model has been trained, the trained model 416 may be verified or evaluated. One method for verifying the validity or accuracy of a trained model 416 is to see how the trained model 416 evaluates or classifies some other set of data. For instance, the trained model 416 may be fed the testing data 412, which was not used for training the model and was held separate from the training data. Once the testing data 412 has been fed into the model, the results of the classification may be evaluated. At this stage we have a model ready for evaluation 418 or a verified model.

Figure 5:
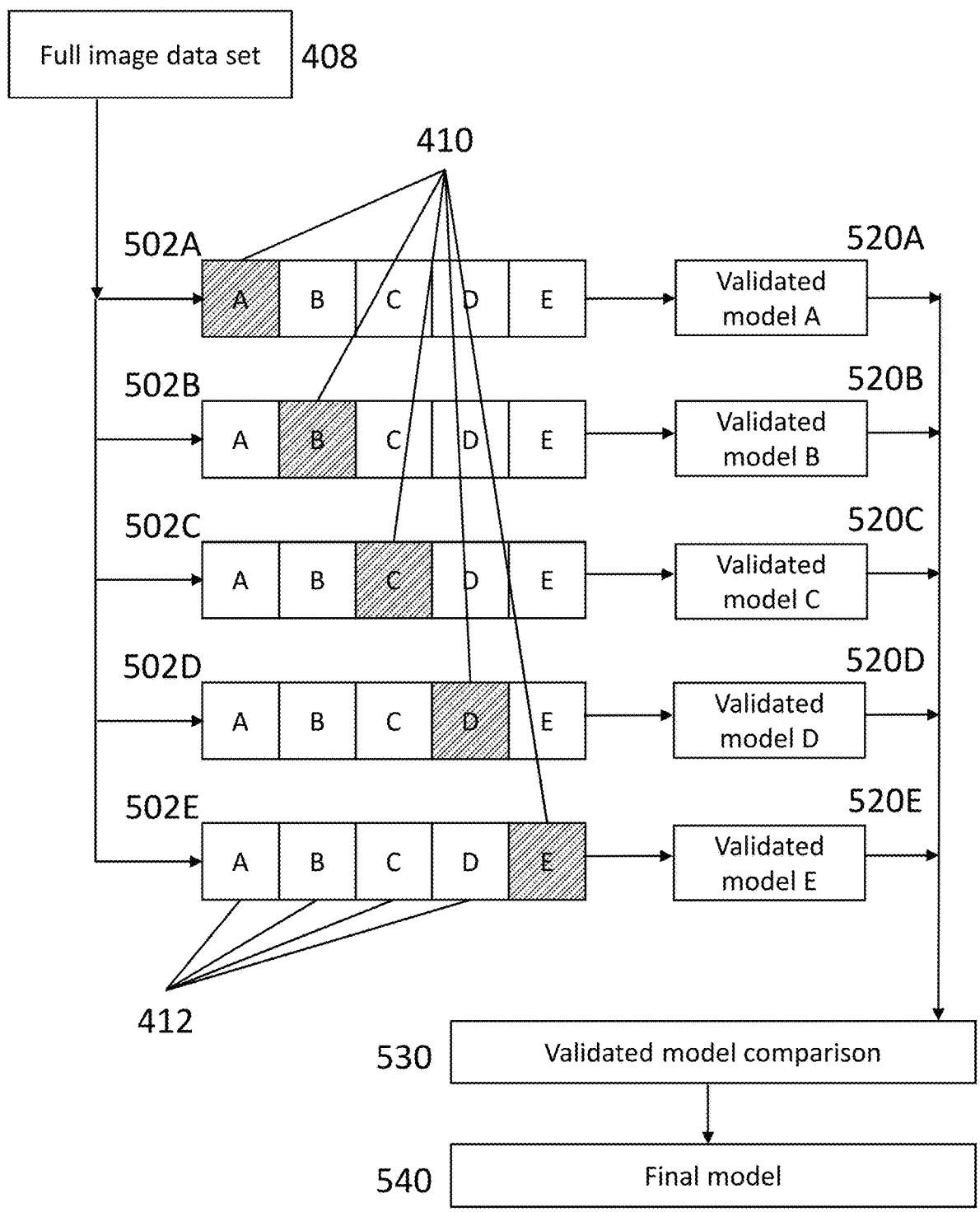
FIG. 5 illustrates cross validation training of a model.

Another method of creating a trained and verified model is illustrated in FIG. 5. This method is called k-fold cross-validation. The full image data set 408 is still divided into a set of training data 410 and a set of testing data 412. In this instance, however, the testing data 412 may be sub-divided into multiple groups, and so may be larger than the training data set 410. Thus the full image data 408 may be divided into k groups, one of which becomes the training data 410 and the other four of which become different groups of testing data 412.

In the example depicted in FIG. 5, the full image data set is divided into five groups and the untrained model is trained five times 502A-502E, once on each of the five training data sets, and then tested four times on each of the remaining four testing data sets. This process produces five trained and validated models 520A-520E using five different training data sets. These trained and validated models 520A-520E may be evaluated 530 and then selected or integrated to form a final model 540 for use in a clinical setting. This cross-validation technique may avoid skewing the trained model due to problems of bias with a selected training data set.

Figure 7:
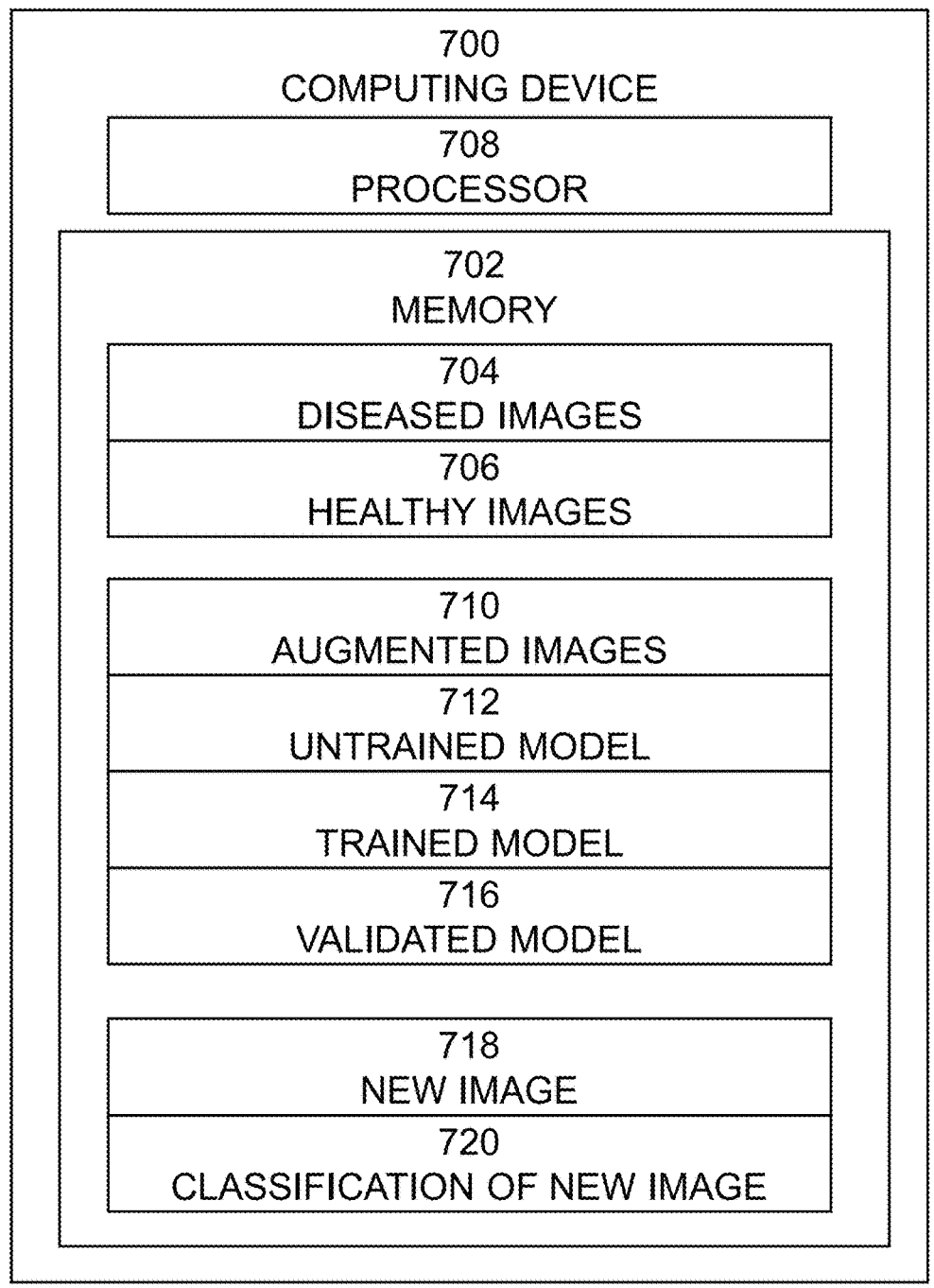
FIG. 7 illustrates an electronic computing device embodiment.

FIG. 7 illustrates an electronic computer embodiment for application of the current disclosure. A computing device 700 may comprise a processor 708 and computer memory 702. Stored in the computer memory may be images of diseased tissue 704 and images of healthy tissue 706. The processor 708 may act upon the images in memory to create a new set of augmented images 710. These images may be used on an untrained model 712 to create a trained model 714 and then a validated model 716. A new image 718 may be input into the validated model and the device may output a classifier 720 associated with the new image based on the model and the new image.

As shown in FIG. 7, the present systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for improving machine learning algorithm performance comprising:
   receiving a first constituent image comprising healthy human tissue;
   receiving a second constituent image comprising unhealthy human tissue;
   overlapping a portion of the second constituent image on a portion of the first constituent image to create an augmented image;
   generating, using a function, a value of a pixel of the augmented image, wherein the pixel is at a grid location in the overlapping portions of the second and the first constituent images within the augmented image, and wherein the function receives as a first input a first value of a pixel of the first constituent image at a grid location within the first constituent image which corresponds to the grid location of the pixel of the augmented image and as a second input a second value of a pixel of the second constituent image at a grid location within the second constituent image which corresponds to the grid location of the pixel of the augmented image; and
   training a model using a dataset comprising at least the augmented image.

2. The method of claim 1, wherein training the model further comprises classifying the augmented image based on a classifier of the first constituent image and on a classifier of the second constituent image.

3. The method of claim 1, wherein the function may comprise a maximum value of any of the pixels of the constituent images at the location.

4. The method of claim 1, wherein the function may comprise a weighted sum of the values of the pixels of the constituent images at the location.

5. The method of claim 4, wherein weights of the weighted sum may be based on at least one of the following: a first image classification, a second image classification, a position in the first constituent image, or a position in the second constituent image.

6. A system for improving machine learning algorithm performance comprising:
   a processor;
   memory accessible by the processor; and
   computer program instructions stored in the memory and executable by the processor to perform the steps of:
   receiving a first constituent image comprising healthy human tissue;
   receiving a second constituent image comprising unhealthy human tissue:
   overlapping a portion of the second constituent image on a portion of the first constituent image to create an augmented image;
   generating, using a function, a value of a pixel of the augmented image, wherein the pixel is at a grid location in the overlapping portions of the second and the first constituent images within the augmented image, and wherein the function receives as a first input a first value of a pixel of the first constituent image at a grid location within the first constituent image which corresponds to the grid location of the pixel of the augmented image and as a second input a second value of a pixel of the second constituent image at a grid location within the second constituent image which corresponds to the grid location of the pixel of the augmented image; and
   training a model using a dataset comprising at least the augmented image.

7. The system of claim 6, wherein training the model further comprises classifying the augmented image based on a classifier of the first constituent image and a classifier of the second constituent image.

8. The system of claim 6, wherein the function may comprise a maximum value of any of the pixels of the constituent images at the location.

9. The system of claim 6, wherein the function may comprise a weighted sum of the values of the pixels of the constituent images at the location.

10. The system of claim 9, wherein weights of the weighted sum may be based on at least one of the following: a first image classification, a second image classification, a position in the first constituent image, or a position in the second constituent image.

11. A computer program product for improving machine learning algorithm performance, the computer program product comprising a non-transitory computer readable storage having program instructions embodied therewith, the program instructions executable by a computer, to cause the computer to perform a method comprising:
   receiving a first constituent image comprising healthy human tissue;
   receiving a second constituent image comprising unhealthy human tissue:
   overlapping a portion of the second constituent image on a portion of the first constituent image to create an augmented image;
   generating, using a function, a value of a pixel of the augmented image, wherein the pixel is at a grid location in the overlapping portions of the second and the first constituent images within the augmented image, and wherein the function receives as a first input a first value of a pixel of the first constituent image at a grid location within the first constituent image which corresponds to the grid location of the pixel of the augmented image and as a second input a second value of a pixel of the second constituent image at a grid location within the second constituent image which corresponds to the grid location of the pixel of the augmented image; and
   training a model using a dataset comprising at least the augmented image.

12. The computer program product of claim 11, wherein training the model further comprises classifying the augmented image based on a classifier of the first constituent image and a classifier of the second constituent image.

13. The computer program product of claim 11, wherein the function may comprise a weighted sum of the values of the pixels of the constituent images at the location and wherein the weights of the weighted sum may be based on at least one of the following: a first image classification, a second image classification, a position in the first constituent image, or a position in the second constituent image.

* * * * *